United States Patent
Michigami et al.

[11] Patent Number: 5,029,097
[45] Date of Patent: Jul. 2, 1991

[54] TOOL DETECTING APPARATUS

[75] Inventors: Norio Michigami, Isehara; Tamio Otani, Hadano; Yasuhiko Kanaya, Machida, all of Japan

[73] Assignee: Hitachi Seiko Ltd., Tokyo, Japan

[21] Appl. No.: 360,094

[22] Filed: Jun. 1, 1989

[30] Foreign Application Priority Data

Jun. 3, 1988 [JP] Japan .................. 63-135534

[51] Int. Cl.$^5$ ............................................. G06F 15/46
[52] U.S. Cl. .......................... 364/474.35; 364/474.37; 356/373
[58] Field of Search ................ 364/474.35, 474.28, 364/474.37, 513, 559, 563; 356/373, 375, 376, 384; 901/47; 382/8, 14, 46

[56] References Cited
U.S. PATENT DOCUMENTS

| 4,441,205 | 4/1984 | Berkin et al. ............. | 382/8 |
| 4,630,225 | 12/1986 | Hisano ..................... | 364/559 |
| 4,631,519 | 12/1986 | Johnston .................. | 341/13 |
| 4,658,494 | 4/1987 | Ohtani et al. ............ | 29/568 |

Primary Examiner—Jerry Smith
Assistant Examiner—Paul Gordon
Attorney, Agent, or Firm—Antonelli, Terry, Stout & Kraus

[57] ABSTRACT

A tool detecting apparatus including a first detection part having a plurality of arrayed light-receiving elements receiving a beam of light passing around a tool placed in an optical path and a memory circuit for sequentially storing binary signals corresponding to the outputs of the light-receiving elements scanned at a predetermined time interval thereby updating its previous contents, and at least one of a second detection part, third detection part and a fourth detection part. The second detection part includes a state detection circuit and a timing circuit while the third detection part includes a holding circuit and an arithmetic circuit. The fourth detection part includes another arithmetic circuit.

12 Claims, 1 Drawing Sheet

TOOL DETECTING APPARATUS

BACKGROUND OF THE INVENTION

This invention relates to a machine tool for machining a workpiece, for example, a printed circuit board, and more particularly to a tool detecting apparatus for detecting a tool such as a drill or an end mill held on a spindle.

The position of a tool used in a machine tool is commonly detected by bringing a probe of a detector into contact with the tip of the tool.

For the purpose of detection of a small tool such as that used in a drilling machine for drilling holes in printed circuit boards, various tool detecting apparatus were proposed, and, as an example of such prior art apparatus, it was proposed to use an optical type detector, as disclosed in U.S. Pat. No. 4,658,494.

However, all of these prior art tool detecting apparatus were designed to detect the position of the tip of a tool, and the accuracy of detection was limited.

With the increasing production of a variety of kinds of printed circuit boards, a variety of kinds of machining have been required for the printed circuit boards, and machining with high accuracy has been increasingly demanded.

For example, in the case of drilling a blind hole or milling a groove in a printed circuit board, a depthwise accuracy as high as about ±20 μm is now demanded.

Also, in the case of drilling through holes in a printed circuit board, drilling of a variety of kinds of diameters between 0.1 mm and 6.3 mm with an increment of 0.1 mm is now demanded, and, as a result, management for supplying such many kinds of drills becomes complex.

Therefore, it has been desired to detect, with high accuracy, the tip position, diameter or eccentricity of a tool supplied to a spindle of a machine tool to effect machining which meets desired machining requirements.

SUMMARY OF THE INVENTION

With a view to satisfy the above demands, it is an object of the present invention to provide a tool detecting apparatus which can highly accurately detect the tip position, diameter or eccentricity of a tool mounted on the spindle of a machine tool.

In accordance with one aspect of the present invention which attains the above object, there is provided a tool detecting apparatus comprised of first detecting means for optically detecting a tool and converting the result of detection into a corresponding electrical signal, and at least one of second, third and fourth detecting means for processing the electrical output signal of the first detecting means so as to carry out a desired detection.

The first detecting means includes a plurality of arrrayed light-receiving elements receiving a beam of light passing around the tool placed in an optical path, and memory means for sequentially storing a group of binary signals corresponding to the outputs of the light-receiving elements scanned at a predetermined time interval thereby updating its previous contents.

The second detecting means includes means for detecting displacement of a tool-holding spindle from its original position (or reference position) thereby detecting the present position of the spindle, means for detecting, on the basis of the contents of the memory means in the first detecting means, the timing of detection of a predetermined portion such as the tip of the spindle by the light-receiving elements, and means for calculating, on the basis of the position of the spindle detected at the detection timing, a correction value required for correcting the amount of displacement of the spindle at the time of machining.

The third detecting means includes means for holding the maximum number of the light-receiving elements covered by the shadow of the tool while the tool makes its one revolution, and means for calculating the diameter of the tool on the basis of the held maximum number of the shaded light-receiving elements.

The fourth detecting means includes means for, while the tool makes its one revolution, detecting the most significant and the least significant bit position where a level change occurs in the binary signals sequentially stored in the memory means in the first detecting means and calculating the amount of eccentricity of the tool on the basis of the difference between those positions.

One or two of the second, third and fourth detecting means can be suitably selected and used as required. It is apparent that all of the second, third and fourth detecting means may be used without selection.

DESCRIPTION OF THE PREFERRED EMBODIMENTS

Figure 1:
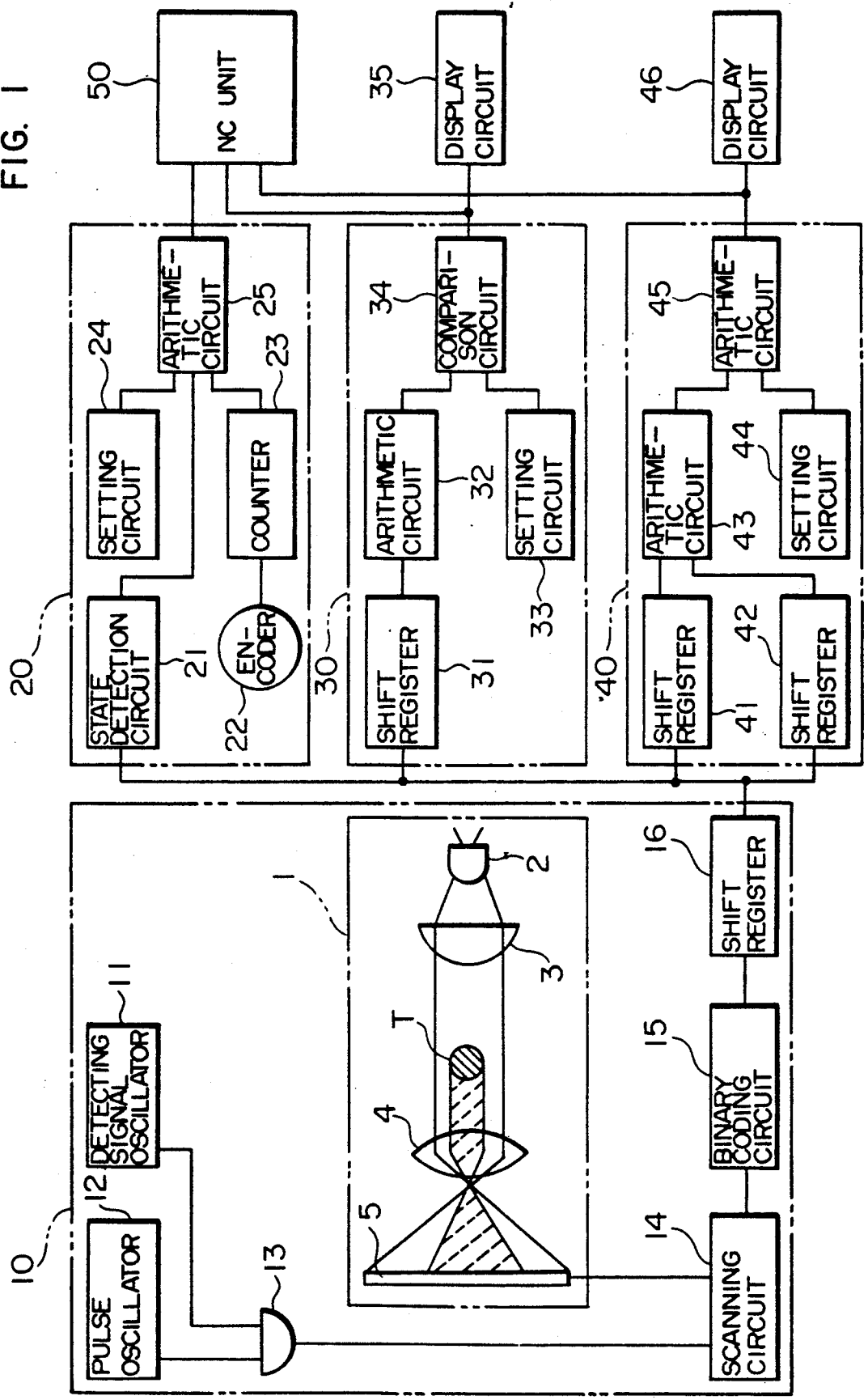
FIG. 1 is a block diagram showing the structure of a preferred embodiment of the tool detecting apparatus according to the present invention.

A preferred embodiment of the tool detecting apparatus according to the present invention will now be described in detail with reference to FIG. 1.

In FIG. 1, a detector 1 includes a lamp 2, a first lens 3 for converting light emitted from the lamp 2 into a parallel beam of light, a second lens 4 for diverging this parallel light beam, and a light-receiving device 5 (for example, a charge coupled device) consisting of a plurality of linearly arrayed light-receiving elements for receiving the beam of light emanating from the second lens 4. A tool T held on a spindle (not shown) fed by a feed motor (not shown) is inserted between the lenses 3 and 4.

First detecting means 10 includes the detector 1, a detecting-signal oscillation circuit 11 generating a tool detecting signal indicative of the fact that the tool T is being detected, a pulse oscillation circuit 12 generating a pulse signal having a predetermined pulse interval for scanning the light-receiving device (elements) 5, an AND gate 13 permitting passage of the pulse signal only when the tool detecting signal is being generated, a scanning circuit 14 detecting outputs of the light-receiving elements 5 in response to the application of the pulse signal through the AND gate 13, a binary coding circuit 15 amplifying the outputs of the light-receiving device (elements) 5 applied from the scanning circuit 14 and comparing the received outputs with a pre-set threshold value thereby converting the outputs of the light-receiving elements 5 into corresponding binary signals, and a shift register 16 storing the binary signals obtained as a result of one scanning cycle thereby updating the contents stored in the preceding scanning cycle. The number of bits of this shift register 16 is equal at least to the number of picture elements of the light-receiving device 5.

Second detecting means 20 includes a state detection circuit 21 which reads the contents of the shift register 16. It is defined herein that a logical level "1" corresponds to a state in which a light-receiving element in the light-receiving device 5 is receiving light, while it is a matter of course that it is possible to allot "0" to the same state. The state detection circuit 21 detects the time at which the contents of the shift register 16 change from a state in which all of the bits are "1's" to a state in which at least one of the bits is "0" or from a state in which certain of bits are "0's" to a state in which all of the bits are "1's". The second detecting means 20 further includes a counter 23 counting pulses of a pulse signal generated from a pulse encoder 22 coupled to the feed motor feeding the spindle holding the tool T, so as to detect the current position of the spindle, that is, to detect the amount of displacement of the spindle from its original or reference position. The second detecting means 20 further includes a setting circuit 24 previously setting the amount of reference displacement of the spindle from its original position when a predetermined portion of the tool T, for example, the tip of the tool T held on the spindle in a relation accurately conforming to machining specification requirements is located at the position allowing the predetermined portion to be detected, that is, at the position where the shadow of the tip of the tool T traverses the light-receiving device 5. The second detecting means 20 further includes an arithmetic circuit 25 comparing the count of the counter 23 with the reference displacement of the spindle set in the setting circuit 24 when the detection output signal is applied from the state detection circuit 21. The arithmetic circuit 25 generates an output signal representing a correction value corresponding to the difference obtained by the comparison so as to correct or compensate the amount of displacement of the spindle at the time of machining. The amount of displacement of the spindle from its original position at the time of detection of a state change by the state detection circuit 21 coincides with the amount of reference displacement if the tool T is properly held on the spindle. In such a case, the amount of displacement of the spindle need not be corrected or compensated during the subsequent period of machining by the tool T. On the other hand, when the tool T is not properly held on the spindle, the amount of displacement of the spindle during the subsequent period of machining is to be corrected by the correction value so that machining accurately conforming to the machining specification requirements can be carried out.

Third detecting means 30 includes a shift register 31 reading the contents of the shift register 16 while the tool T makes one complete revolution and storing the number of "0's" in the read contents of the shift register 16, thereby updating the number of "0's" in the previous contents so as to hold the maximum number of "0's⇌. The third detecting means 30 further includes an arithmetic circuit 32 calculating the diameter of the tool T on the basis of the contents of the shift register 31 and the pitch of the arrayed light-receiving elements 5, a setting circuit 33 previously setting the diameter of the tool T, and a comparison circuit 34 comparing the output of the arithmetic circuit 32 with the tool diameter setting in the setting circuit 33 and generating an output signal representing the result of comparison.

Fourth detecting means 40 includes a shift register 41 reading the contents of the shift register 16 while the tool T makes at least one revolution to detect and store, the bit position where a level change from "1" to "0" occurs in the read contents of the shift register 16 so as to update the most significant bit position of its contents. The fourth detecting means 40 further includes a shift register 42 reading the contents of the shift register 16 to detect and store the bit position where a level change from "0" to "1" occurs in the read contents of the shift register 16 so as to update the least significant bit position of its contents. The fourth detecting means 40 further includes an arithmetic circuit 43 calculating the amount of displacement of the tool T in the radial direction on the basis of the contents of the shift registers 41 and 42, a setting circuit 44 previously setting the diameter of the tool T, and an arithmetic circuit 45 comparing the output of the arithmetic circuit 43 with the tool diameter setting in the setting circuit 44 and generating an output signal representing the result of comparison.

The second, third and fourth detecting means 20, 30 and 40 constitute detecting/arithmetic processing means for detecting the tool T.

An NC (numerical control) unit 50 is connected to the arithmetic circuit 25 and to the comparison circuits 34 and 45.

A display circuit 35 displays the result of comparison by the comparison circuit 34.

Another display circuit 46 displays the result of comparison by the comparison circuit 45.

In operation, the tool T held on the spindle is inserted between the lenses 3 and 4 in the detector 1 and is rotated by rotating the spindle. At the same time, the tool detecting signal is generated from the oscillation circuit 11, and the lamp 2 is energized to project the shadow of the tool T on the light-receiving device 5.

The pulse signal generated from the pulse oscillation circuit 12 is applied through the AND gate 13 to the scanning circuit 14. The scanning circuit 14 scans from one end toward the other end of the array of the light-receiving device 5 to sequentially detect the outputs of the light receiving elements in the light-receiving device 5. These outputs are sequentially applied to the binary coding circuit 15. In the binary coding circuit 15, the output from each of the light-receiving elements exposed to the beam of light from the lamp 2 is converted into a "1" level, while the output from each of the light-receiving elements covered by the shadow of the tool T is converted into a "0" level, and such a group binary signals is applied to the shift register 16. The shift register 16 holds the binary signal group until the next group of binary signals is applied in the next scanning cycle, and, when the next group of binary signals is applied, the contents of the shift register 16 are updated by the next group of binary signals.

The shift register 31 reads the contents of the shift register 16 and stores the number of "0's" included in the read contents of the shift register 16. Among the binary signals stored in the shift register 16 while the tool T makes one revolution, those having the maximum number of "0"' are stored in the shift-register 31 to update the contents, and this maximum number of "0's" is held in the shift register 31.

The arithmetic circuit 32 multiplies the output of the shift register 31 by the pitch (distance) of the arranged light-receiving elements 5 to calculate the diameter of the tool T.

On the other hand, the diameter of the tool T is previously set in the setting circuit 33 under command of the NC unit 50.

The comparison circuit 34 compares the output of the arithmetic circuit 32 with the tool diameter setting supplied from the setting circuit 33, and an output signal representing the result of comparison is applied to both the NC unit 50 and the display circuit 35. When the tool T held on the spindle has a diameter satisfying the requirements of the machining specification, the result of comparison indicates "good", while when the diameter of the tool T does not satisfy the requirements of the machining specification, the result of comparison indicates "bad".

Whether the result of comparison is "good" or "bad" is displayed by, for example, lamps of different colors in the display circuit 35. Also, when the result of comparison is "good", the machine continues its operation under control of the NC unit 50, while when the result of comparison is "bad", the tool T is replaced or the operation of the machine is discontinued, and an alarm is issued under control of the NC unit 50.

The shift register 41 reads the contents of the shift register 16 to detect and store the bit position where a level change from "1" to "0" occurs in the read contents of the shift register 16. While the tool T makes at least one revolution, the bit position at which the level changes from "1" to "0" is sequentially updated by a more significant bit position, and, in this manner, the bit position is finally updated by the most significant bit position. This most significant bit position of the level change is held in the shift register 41.

Similarly, the shift register 42 reads the contents of the shift register 16 to detect and store the bit position where a level change from "0" to "1" occurs in the read contents of the shift register 16. While the tool T makes at least one revolution, the bit position at which the level change from "0" to "1" is sequentially updated by a less significant bit position, and, in this manner, the bit position is finally updated by the least significant bit position. This least significant bit position is held in the shift register 42.

The arithmetic circuit 43 calculates the difference between the contents of these shift registers 41 and 42 to calculates the amount of radial displacement of the tool T.

On the other hand, the diameter of the tool T is also previously set in the setting circuit 44 under command of the NC unit 50.

The arithmetic circuit 45 subtracts the tool diameter set in the setting circuit 44 from the amount of tool displacement calculated by the arithmetic circuit 43 to calculate the amount of eccentricity of the tool T, and an output signal representing the calculated amount of tool eccentricity is applied to both the NC unit 50 and the display circuit 46.

Whether the amount of eccentricity of the tool T is less than an allowance or not is displayed by, for example, lamps of different colors in the display circuit 46. Also, when the amount of eccentricity of the tool T is less than the allowance, the machine continues its operation under control of the NC unit 50, while when the amount of eccentricity of the tool T exceeds the allowance, the tool T is replaced or the operation of the machine is discontinued, and an alarm is issued under control of the NC unit 50.

This measurement of the diameter and eccentricity of the tool T is carried out each time the tool T is replaced by a new one. The position of the tip of the tool T is also measured each time the tool T is replaced. As to the measurement of tip position, two sequences of measurement as described below can be possible. (It is apparent that other sequences of measurement can be carried out.) According to the first sequence of measurement, the position of the tip of the tool T is measured while the tool is being inserted in the detector 1 after the tool T is replaced. Then, the diameter and eccentricity of the tool T are measured. According to the second sequence of measurement, the diameter and eccentricity of the tool T are first measured after the tool T is replaced. After the measurement of the diameter and eccentricity of the tool T, the position of the tip of the tool T is measured while the tool T is being retracted from the position inserted in the detector 1. The tip position measurement executed under the second sequence of measurement will now be explained.

When the tool T is retracted from the position inserted in the detector 1, and the shadow of the tool T is not projected on the light-receiving device 5, the binary signals stored in the shift register 16 are all in a state "1". When the state detection circuit 21 detects the above fact, an actuation signal is applied from the state detection circuit 21 to the arithmetic circuit 25. The arithmetic circuit 25 calculates the difference between the count of the counter 23 and the reference displacement set in the setting circuit 24 and applies an output signal representing the calculated difference to the NC unit 50. The above difference represents a correction value used for correcting the amount of displacement of the spindle at the time of machining.

In the manner described above, the tip position, diameter and eccentricity of the tool T held on the spindle can be measured.

Thus, when a charge coupled device having its cells arrayed at a pitch of distance of 7 $\mu$m is used to function as the light-receiving device 5, and the shadow of the tool T is projected on the charge coupled device with a magnification of 3.5, measurement in units of as small as 2 $\mu$m can be made, so that the tip position, diameter and eccentricity of the tool T can be detected with high accuracy.

In the aforementioned embodiment, the shift registers 31, 41 and 42 are provided independently of one another and independently of the shift register 16. However, it is apparent that the shift register 16 can also function as these shift registers 31, 41 and 42.

Further, one or two or all of the second, third and fourth detecting means 20, 30 and 40 in the aforementioned embodiment may be selectively used as required.

Further, instead of using both the setting circuits 33 and 44, one of them may be used as a common setting circuit. Further, the result of calculation by the arithmetic circuit 32 may be set in the setting circuit 44.

It will be understood from the foregoing detailed description that the tool detecting apparatus of the present invention can measure the tip position, diameter and/or eccentricity of a tool with high accuracy.

We claim:

1. A tool detecting apparatus comprising:
   first detecting means including a plurality of arrayed light-receiving elements receiving a beam of light passing around a tool placed in an optical path, and memory means for sequentially storing a group of binary signals corresponding to the outputs of said light-receiving elements scanned at a predetermined time interval thereby updating its previous contents; and
   detecting/arithmetic processing means for detecting said tool in response to an output of said first detecting means, said detecting/arithmetic processing means including at least one of second, third and fourth detecting means, said second detecting means including means for detecting displacement of a tool-holding spindle from its original position thereby detecting the current position of said spindle, means for detecting, on the basis of the contents of said memory means, the timing of detection of a predetermined portion of said spindle by said light-receiving elements, and means for calculating, on the basis of the position of said spindle detected at said detection timing, a correction value required for correcting the amount of displacement of said spindle at the time of machining, said third detecting means including means for holding the maximum number of said light-receiving elements covered by the shadow of said tool while said tool makes one revolution, and means for calculating the diameter of said tool on the basis of the held maximum number of said shaded light-receiving elements, and said fourth means including means for detecting a most significant and a least significant bit position where a level change occurs in the binary signals sequentially stored in said memory means and calculating the amount of eccentricity of said tool on the basis of the difference between said positions.

2. A tool detecting apparatus according to claim 1, wherein said detecting/arithmetic processing means includes said second detecting means.

3. A tool detecting apparatus according to claim 1, wherein said detecting/arithmetic processing means includes said third detecting means.

4. A tool detecting apparatus according to claim 1, wherein said detecting/arithmetic processing means includes said fourth detecting means.

5. A tool detecting apparatus according to claim 1, wherein said detecting/arithmetic processing means includes said second and third detecting means.

6. A tool detecting apparatus according to claim 1, wherein said detecting/arithmetic processing means includes said second and fourth detecting means.

7. A tool detecting apparatus according to claim 1, wherein said detecting/arithmetic processing means includes said third and fourth detecting means.

8. A tool detecting apparatus according to claim 1, wherein said detecting/arithmetic processing means includes said second, third and fourth detecting means.

9. A tool detecting apparatus according to claim 1, wherein said correction value calculating means includes means for previously setting an amount of reference displacement of said spindle from its reference position when said light-receiving elements are traversed by the shadow of said predetermined portion of said tool held on said spindle in a relation satisfying machining specification requirements, and arithmetic means responsive to said timing detecting means for comparing the value of the position of said spindle detected by said spindle position detecting means with said reference displacement of said spindle and generating the result of comparison as said correction value.

10. A tool detecting apparatus according to claim 1, wherein said tool diameter calculating means calculates the diameter of said tool on the basis of the maximum number of said shaded light-receiving elements and the distance between said arrayed light-receiving elements.

11. A tool detecting apparatus according to claim 1, wherein said third detecting means further includes means for previously setting the diameter of said tool and means for comparing the output of said tool diameter calculating means with the set value of said tool diameter.

12. A tool detecting apparatus according to claim 1, wherein said tool eccentricity calculating means further includes means for previously setting the diameter of said tool and means for comparing said calculated amount of eccentricity of said tool with the set value of said tool diameter.

* * * * *